United States Patent
Chou

(10) Patent No.: US 11,192,601 B2
(45) Date of Patent: Dec. 7, 2021

(54) STEP SPORTING EQUIPMENT WITH A DOUBLE TRANSMISSION MECHANISM

(71) Applicant: Shui-Chuan Chou, Taipei (TW)

(72) Inventor: Shui-Chuan Chou, Taipei (TW)

(*) Notice: Subject to any disclaimer, the term of this patent is extended or adjusted under 35 U.S.C. 154(b) by 0 days.

(21) Appl. No.: 16/878,615

(22) Filed: May 20, 2020

(65) Prior Publication Data

US 2020/0407014 A1 Dec. 31, 2020

(30) Foreign Application Priority Data

Jun. 26, 2019 (TW) ................................. 108208196

(51) Int. Cl.
| | |
|---|---|
| *B62K 3/00* | (2006.01) |
| *B62K 11/14* | (2006.01) |
| *B62M 15/00* | (2006.01) |
| *B62M 9/02* | (2006.01) |
| *B62K 11/02* | (2006.01) |
| *B62M 9/00* | (2006.01) |

(52) U.S. Cl.
CPC .............. *B62K 3/002* (2013.01); *B62K 11/14* (2013.01); *B62M 9/02* (2013.01); *B62M 15/00* (2013.01); *B62K 11/02* (2013.01); *B62M 9/00* (2013.01)

(58) Field of Classification Search
CPC .................................. B62K 3/002; B62M 9/02
See application file for complete search history.

(56) References Cited

U.S. PATENT DOCUMENTS

| | | | | |
|---|---|---|---|---|
| 1,799,947 A | * | 4/1931 | Benjamin | B62M 11/00 280/221 |
| 8,210,553 B2 | * | 7/2012 | Fan | B62K 3/002 280/221 |
| 8,220,813 B2 | * | 7/2012 | Chou | B62K 3/002 280/221 |
| 9,139,252 B2 | * | 9/2015 | Scolari | B62K 3/002 |
| 9,475,543 B1 | * | 10/2016 | Chou | B62M 9/02 |

FOREIGN PATENT DOCUMENTS

| | | | | |
|---|---|---|---|---|
| CN | 107128435 A | * | 9/2017 | |
| EP | 1818248 A2 | * | 8/2007 | B62K 3/002 |
| WO | WO-0202395 A1 | * | 1/2002 | B62K 3/002 |

* cited by examiner

*Primary Examiner* — Kevin Hurley

(57) ABSTRACT

A step sporting equipment with a double transmission mechanism, wherein a transmission mechanism and a treading mechanism are located on both sides of a frame body respectively. Each transmission mechanism at least comprises a front wheel disc, a rear wheel disc and a driving piece. Each treading mechanism is connected to the corresponding transmission mechanism. When the user treads on each treading mechanism, each treading mechanism can compel the corresponding transmission mechanism to work. In addition, as the front wheel disc and rear wheel disc are linked by a driving piece, there is higher moving phase. Therefore, with two transmission mechanisms, the dimensional discrepancy of elements resulted from tolerance can be tolerated effectively, and the step sporting equipment can remain in normal operation.

4 Claims, 4 Drawing Sheets

STEP SPORTING EQUIPMENT WITH A DOUBLE TRANSMISSION MECHANISM

BACKGROUND OF INVENTION

1. Field of the Invention

The present invention relates to a step sporting equipment with a double transmission mechanism.

2. Description of Related Art

The inventor of the present invention has invented two scooters, which are U.S. Pat. No. 8,220,813 "a scooter with a transmission mechanism" and U.S. Pat. No. 9,475,543 "a transmission mechanism for increasing the forward kinetic energy of scooter". Taiwan Patent Nos. are M383531 and M507387, the user treads on two movable plates of scooter with both feet to implement the exercise effect of a stair stepper, meanwhile the scooter slides forward. Referring to FIG. 1 of the present invention (representative figure of U.S. Pat. No. 9,475,543) for its structure, the scooter 1 is a sort of step sporting equipment, comprising a frame body 11 and a transmission mechanism 10. The transmission mechanism 10 comprises a driving wheel disc 101, a left treading mechanism A and a right treading mechanism B. Wherein the central axle 1011 of the driving wheel disc 101 is pivoted on the back-end of the frame body 11. The driving wheel disc 101 (e.g. fluted disc) can be connected to the driven wheel disc 171 by a transmission component 102 (e.g. chain), when the central axle 1011 drives the driving wheel disc 101 to rotate, the driving wheel disc 101 can drive the driven wheel disc 171 and the rear wheel 17 to rotate through the transmission component 102.

The left treading mechanism A is located on the left side of frame body 11, the right treading mechanism B is located on the right side of the frame body 11. The left treading mechanism A comprises a left pedal A10, a left front drive connecting rod A11, a left rear drive connecting rod A12 and a middle left drive connecting rod A13. The right treading mechanism B comprises a right pedal B10, a right front drive connecting rod B11, a right rear drive connecting rod B12 and a middle right drive connecting rod B13. Wherein one end of the left front drive connecting rod A11 and right front drive connecting rod B11 is pivoted on the front supporter 111 of the frame body 11.

However, the inventor found deficiencies, one end of the left front drive connecting rod A11 or right front drive connecting rod B11 is pivoted on the front supporter 111, so if there are dimension errors between the front supporter 111 and the left front drive connecting rod A11 or right front drive connecting rod B11 in production manufacturing, there will be problems in the linkage of the whole left treading mechanism A or right treading mechanism B, even the left treading mechanism A or right treading mechanism B cannot be fixed to the frame body 11. Therefore, the dimensions of front supporter 111 and left front drive connecting rod A11 or right front drive connecting rod B11 shall be corrected many times, so that the scooter 1 (step sporting equipment) can be actuated smoothly. However, the front supporter 111 or left front drive connecting rod A11 (right front drive connecting rod B11) is a rigid rod, it is very difficult to modify specific dimensions, inducing difficult production and inconvenient assembly, the yield cannot be increased. Therefore, how to solve the above problems is the topic of the present invention.

SUMMARY OF THE INVENTION

It still has shortcomings in the above sports equipment. The present invention is to develop a step sports equipment with double transmission mechanism to reduce the defect rate in production.

The present invention provides to a step sporting equipment with a double transmission mechanism, comprising a frame body, at least composed of a gripping part and a principal part, wherein the gripping part can be directly or indirectly fixed to the principal part; a first transmission mechanism, located on one side of the principal part, at least composed of a first front wheel disc, a first rear wheel disc and a first driving piece, a first front central axle of the first front wheel disc can be pivoted on the principal part, a first rear central axle of the first rear wheel disc can be pivoted on the principal part, and located behind the first front central axle, the first front wheel disc and the first rear wheel disc can rotate synchronously through the first driving piece; a first treading mechanism, at least composed of a first front drive linkage, a first rear drive linkage and a first pedal, wherein one end of the first front drive linkage can be fixed to the first front central axle, the other end of the first front drive linkage can be fixed to the first pedal, one end of the first rear drive linkage can be fixed to the first rear central axle, the other end of the first rear drive linkage can be fixed to the first pedal, and located behind the other end of the first front drive linkage; a second transmission mechanism, located on the opposite side of the principal part, at least composed of a second front wheel disc, a second rear wheel disc and a second driving piece, a second front central axle of the second front wheel disc can be pivoted on the principal part, and fixed to the first rear central axle through a rear rod, so as to be synchronously linked; a second rear central axle of the second rear wheel disc can be pivoted on the principal part, and located behind the second front central axle, the second front wheel disc and the second rear wheel disc can rotate synchronously through the second driving piece; and a second heading mechanism, at least composed of a second front drive linkage, a second rear drive linkage and a second pedal, wherein one end of the second front drive linkage can be pivoted on the principal part, and fixed to the first front central axle through a front rod, so as to be synchronously linked, the other end of the second front drive linkage can be fixed to the second pedal; one end of the second rear drive linkage can be fixed to the second rear central axle, the other end of the second rear drive linkage can be fixed to the second pedal, and located behind the other end of the second front drive linkage.

More particularly, wherein the first front drive linkage and the first rear drive linkage are composed of at least three rods pivoted in turn respectively.

More particularly, wherein the second front drive linkage and the second rear drive linkage at least comprise three rods pivoted in turn respectively.

More particularly, wherein a handlebar is fixed to the top end of the gripping part.

More particularly, wherein the back end of the principal part is provided with at least a load, the load can be connected to the second rear central axle, so as to be driven by the second rear central axle to rotate.

More particularly, wherein at least a front wheel is pivoted on the bottom of the gripping part, and the handlebar can control the direction of the front wheel.

DETAILED DESCRIPTION OF THE INVENTION

Figure 1:
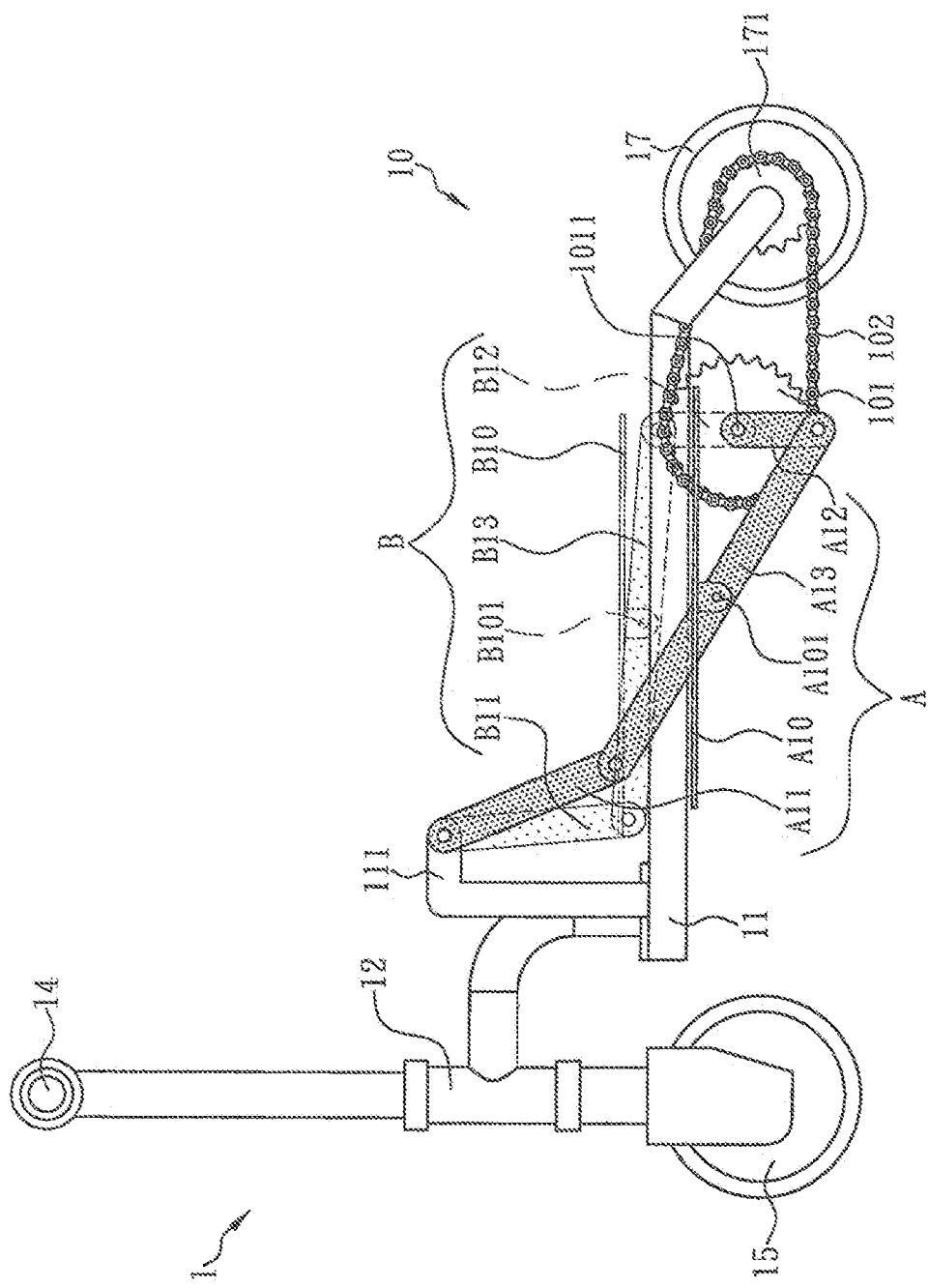
FIG. 1 is a schematic diagram of an old type scooter.
Figure 2:
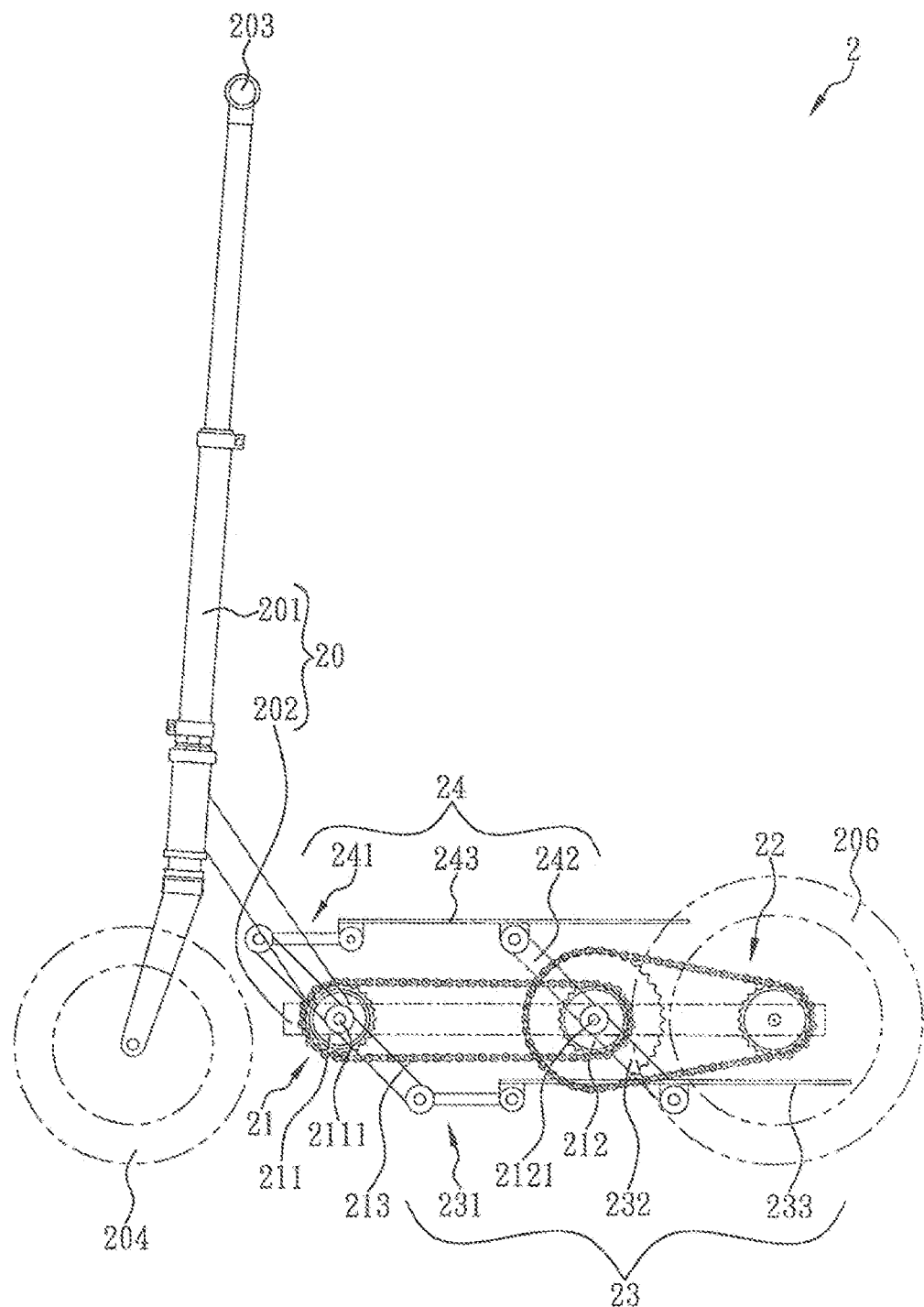
FIG. 2 is a schematic diagram of a step sporting equipment of the present invention.

FIG. 2 shows the step sporting equipment with a double transmission mechanism of the present invention. The step sporting equipment 2 at least comprises a frame body 20, a first transmission mechanism 21, a first treading mechanism 23, a second transmission mechanism 22 and a second treading mechanism 24, Wherein the frame body 20 at least comprises a gripping part 201 and a principal part 202. The gripping part 201 can be directly or indirectly fixed to the principal part 202, its top end is provided with a handlebar 203, so that the user can grip the handlebar 203 to keep balance when operating the step sporting equipment 2.

When the step sporting equipment 2 is a scooter, at least a front wheel 204 is pivoted on the bottom of the gripping part 201, the back end of the principal part 202 is provided with at least a rear wheel (i.e. load 206), and the handlebar 203 can control the direction of the front wheel 204. If the step sporting equipment 2 is a stationary fitness equipment, e.g. a stair stepper, there is no front wheel 204, it is only provided with a handlebar 203, so that the user can grip the handlebar 203 and perform exercise, moreover, the load 206 can be a damped wheel or other load devices.

Figure 3:
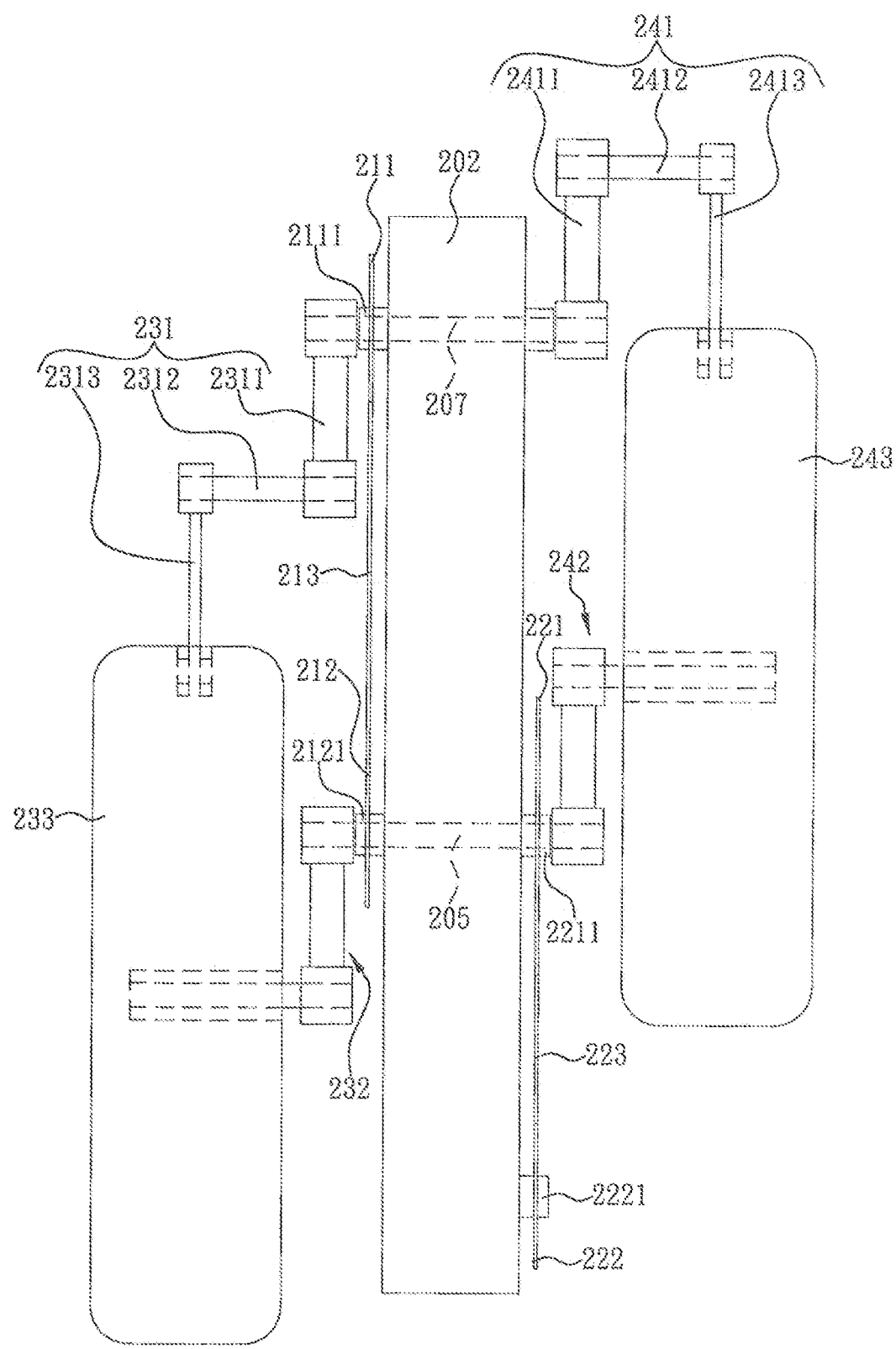
FIG. 3 is a top view of partial components of the step sporting equipment.
Figure 4:
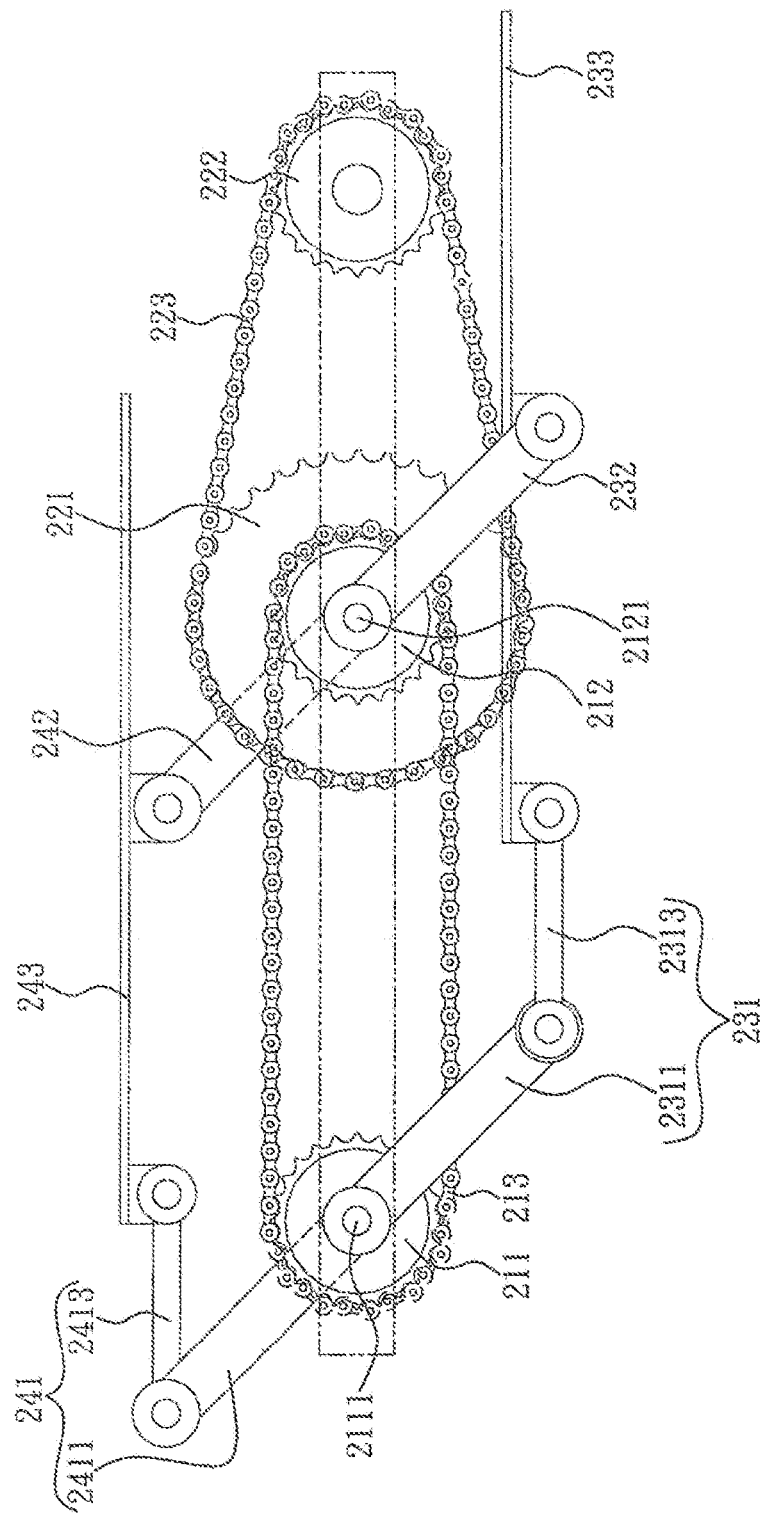
FIG. 4 is a side view of partial components of the step sporting equipment.

As shown in FIGS. 2 to 4, to avoid complexities, the gripping part 201, front wheel 204 and load 206 are omitted in FIGS. 3 and 4. In addition, the first transmission mechanism 21 is located on one side of the principal part 202, and at least composed of a first front wheel disc 211, a first rear wheel disc 212 and a first driving piece 213. Wherein the first front central axle 2111 of the first front wheel disc 211 can be pivoted on the principal part 202. The first rear central axle 2121 of the first rear wheel disc 212 can be pivoted on the principal part 202, and it is located behind the first front central axle 2111. The first front wheel disc 211 and the first rear wheel disc 212 can rotate synchronously through the first driving piece 213. The first driving piece 213 can be a chain, a belt or a plurality of gears according to the structures of the first front wheel disc 211 and the first rear wheel disc 212. The first front wheel disc 211 and the first rear wheel disc 212 can rotate synchronously through the first front wheel disc 211.

The first treading mechanism 23 at least comprises a first front drive linkage 231, a first rear drive linkage 232 and a first pedal 233. Wherein one end of the first front drive linkage 231 can be fixed to the first front central axle 2111. The other end of the first front drive linkage 231 can be fixed to the first pedal 233. In this case, the first front drive linkage 231 at least comprises three rods 2311, 2312, 2313 pivoted in turn (as shown in FIG. 3, but not limited to this). In FIG. 3, the rod 2311 located in the front (i.e. the rod fixed to the first front central axle 2111) can act as a crank to perform rotary motion. The rod 2312 in the center can be orthogonally connected to the front rod 2311. The rod 2313 in the back also can be orthogonally connected to the middle rod 2312, and the other end can be connected to the first pedal 233.

One end of the first rear drive linkage 232 can be fixed to the first rear central axle 2121. The other end of the first rear drive linkage 232 can be fixed to the first pedal 233, and it is located behind the other end of the first front drive linkage 231. In this case, the first rear drive linkage 232 can be composed of one rod, and the rod can act as a crank to perform rotary motion. As two positions of the first pedal 233 are fixed to the first front drive linkage 231 and the oilier end of the first rear drive linkage 232 respectively, when the user treads on the top surface of the first pedal 233, the first pedal 233 cannot perform 360° rotation, but the whole body performs circular motion, so as to form a relatively flat treading surface, and as the user's sole applies a force, the first pedal 233 tilts according to the user's heading posture, so that the user applies a force to the first pedal 233 more easily, driving the first from drive linkage 231 and the first rear drive linkage 232, and applying torsions to the first front central axle 2111 and the first rear central axle 2121.

As shown in FIGS. 2 to 4, the second transmission mechanism 22 is located on the opposite side of principal part 202, at least comprising a second front wheel disc 221, a second rear wheel disc 222 and a second driving piece 223. A second front central axle 2211 of the second front wheel disc 221 can be pivoted on the principal part 202, and fixed to the first rear central axle 2121 through a rear rod 205, so as to be synchronously linked. In addition, the second front central axle 2211, rear rod 205 and the first rear central axle 2121 can be one and the same element (i.e. the same rod) or assembled of multiple elements, as long as they are synchronously linked, not respectively active. A second rear central axle 2221 of the second rear wheel disc 222 can be pivoted on the principal part 202, and located behind the second front central axle 2211, the second front wheel disc 221 and the second rear wheel disc 222 can rotate synchronously through the second driving piece 223. The second driving piece 223 can be a chain, a belt or a plurality of gears according to the structures of the second front wheel disc 221 and the second rear wheel disc 222, the second front wheel disc 221 and the second rear wheel disc 222 can rotate synchronously through the second driving piece 223.

The second treading mechanism 24 at least comprises a second front drive linkage 241, a second rear drive linkage 242 and a second pedal 243. Wherein one end of the second front drive linkage 241 can be pivoted on the principal part 202, and fixed to the first front central axle 2111 through a front rod 207, so as to be synchronously linked. Moreover, the first front central axle 2111, front rod 207 and one end of the second front drive linkage 241 can be one and the same element (i.e. the same rod) or assembled of multiple elements, as long as they are synchronously linked, not respectively active. In addition, the other end of the second front drive linkage 241 can be fixed to the second pedal 243. In this case, the second front drive linkage 241 at least comprises three rods 2411, 2412, 2413 pivoted in turn (as shown in FIG. 3, but not limited to this). In FIG. 3, the rod 2411 near the principal part 202 can act as a crank to perform rotary motion. The rod 2412 in the middle can be orthogonally connected to the rod 2411 near the principal part 202. The rod 2413 far from the principal part 202 also can be orthogonally connected to the middle rod 2412, and the other end can be connected to the second pedal 243.

One end of the second rear drive linkage 242 can be fixed to the second front central axle 2211. The other end of the second rear drive linkage 242 can be fixed to the second pedal 243, and located behind the other end of the second front drive linkage 241. In this case, the second rear drive linkage 242 can be composed of one rod, and the rod can act as a crank to perform rotary motion. As two positions of the second pedal 243 are fixed to the second from drive linkage 241 and the other end of the second rear drive linkage 242 respectively, when the user treads on the top surface of the second pedal 243, the second pedal 243 cannot perform 360° rotation, but the whole body performs circular motion, so as to form a relatively flat treading surface, and as the user's sole applies a force, the second pedal 243 tilts according to the user's treading posture, so that the user applies a force to the second pedal 243 more easily, driving the second front drive linkage 241 and the second rear drive linkage 242, and applying torsions to the front rod 207 and the second front central axle 2211.

Moreover, in this case, the load 206 can be connected to the second rear central axle 2221, and it rotates as the second rear central axle 2221 rotates. The front rod 207 and rear rod 205 can be connected and synchronously linked with the mechanisms on both sides of principal part 202 respectively (first transmission mechanism 21, first treading mechanism 23, second transmission mechanism 22 and second treading mechanism 24), not respectively active. Therefore, when the first pedal 233 is close to the floor, the second pedal 243 is on the top surface of principal part 202, so that the user can apply a force to the pedal at a high level with both feet, and the treading mechanisms 23, 24 can drive the transmission mechanisms 21, 22, so as to operate the load 206.

With two transmission mechanisms, when the dimensions of partial components of the present invention are changed due to tolerance (e.g. longer or shorter front rod 207), as the first driving piece 213 and the second driving piece 223 are more mobile than a rigid rod, there is higher fault tolerance rate, even if the first driving piece 213 or the second driving piece 223 is a little deflected, the first transmission mechanism 21 and the second transmission mechanism 22 can remain in normal operation, meanwhile for the makers, it is easier to adjust the first driving piece 213 and the second driving piece 223, the production convenience is enhanced greatly.

I claim:

1. A step sporting equipment with a double transmission mechanism, comprising a frame body, at least composed of a gripping part and a principal part, wherein the gripping part can be directly or indirectly fixed to the principal part;

a first transmission mechanism, located on one side of the principal part, at least composed of a first front wheel disc, a first rear wheel disc and a first driving piece, a first front central axle of the first front wheel disc can be pivoted on the principal part; a first rear central axle of the first rear wheel disc can be pivoted on the principal part, and located behind the first front central axle, the first front wheel disc and the first rear wheel disc can rotate synchronously through the first driving piece;

a first treading mechanism, at least composed of a first front drive linkage, a first rear drive linkage and a first pedal, wherein one end of the first front drive linkage can be fixed to the first front central axle, the other end of the first front drive linkage can be fixed to the first pedal, one end of the first rear drive linkage can be fixed to the first rear central axle, the other end of the first rear drive linkage can be fixed to the first pedal, and located behind the other end of the first front drive linkage;

a second transmission mechanism, located on the opposite side of the principal part, at least composed of a second front wheel disc, a second rear wheel disc and a second driving piece, a second front central axle of the second front wheel disc can be pivoted on the principal part, and fixed to the first rear central axle through a rear rod, so as to be synchronously linked; and second rear central axle of the second rear wheel disc can be pivoted on the principal part, and located behind the second front central axle, the second front wheel disc and the second rear wheel disc can rotate synchronously through the second driving piece; and a second treading mechanism, at least composed of a second front drive linkage, a second rear drive linkage and a second pedal, wherein one end of the second front drive linkage can be pivoted on the principal part, and fixed to the first front central axle through a front rod, so as to be synchronously linked, the other end of the second front drive linkage can be fixed to the second pedal; one end of the second rear drive linkage can be fixed to the second rear central axle, the other end of the second rear drive linkage can be fixed to the second pedal, and located behind the other end of the second front drive linkage;

wherein the first front drive linkage and the first rear drive linkage are composed of at least three rods pivoted in turn respectively; and wherein the second front drive linkage and the second rear drive linkage at least comprise three rods pivoted in turn respectively.

2. The step sporting equipment with the double transmission mechanism defined claim 1, wherein a handlebar is fixed to the top end of the gripping parts.

3. The step sporting equipment with the double transmission mechanism defined claim 1, wherein the back end of the principal part is provided with at least a load, the load can be connected to the second rear central axle, so as to the driven by the second rear central axle to rotate.

4. The step sporting equipment with the double transmission mechanism defined claim 2, wherein at least a front wheel is pivoted on the bottom of the gripping part, and the handlebar can control the direction of the front wheel.

* * * * *